United States Patent [19]
Sanborn et al.

[11] Patent Number: 5,652,024
[45] Date of Patent: Jul. 29, 1997

[54] WATERBORNE ZINC-RICH PRIMER COMPOSITIONS

[75] Inventors: Timothy Parker Sanborn, Huntersville, N.C.; Joseph Michael Beno, Jr., New Hope; Roy Wesley Flynn, Warrington, both of Pa.

[73] Assignee: Rohm and Haas Company, Philadelphia, Pa.

[21] Appl. No.: 645,981

[22] Filed: May 14, 1996

Related U.S. Application Data

[62] Division of Ser. No. 407,514, Mar. 16, 1995, Pat. No. 5,569,687.

[51] Int. Cl.$^6$ .................................................. B05D 7/14
[52] U.S. Cl. .................. 427/383.7; 427/388.2; 427/388.4
[58] Field of Search .............. 427/388.2, 388.4, 427/383.7

[56] References Cited

U.S. PATENT DOCUMENTS

| | | | |
|---|---|---|---|
| 2,871,223 | 1/1959 | Hankins et al. | 260/70 |
| 4,120,839 | 10/1978 | Emmons et al. | |
| 4,325,856 | 4/1982 | Ishikawa | 523/201 |
| 4,352,898 | 10/1982 | Albers | 523/414 |
| 4,436,772 | 3/1984 | Yamabe et al. | 427/379 |
| 4,654,397 | 3/1987 | Mueller-Mall et al. | 524/460 |
| 4,814,373 | 3/1989 | Frankel et al. | 524/460 |
| 5,017,632 | 5/1991 | Bredow et al. | 523/400 |
| 5,071,902 | 12/1991 | Langerbeins et al. | 524/458 |

FOREIGN PATENT DOCUMENTS

| | | |
|---|---|---|
| 513883A1 | 11/1992 | European Pat. Off. . |
| 52-54724 | 5/1977 | Japan . |

OTHER PUBLICATIONS

The Characterization Of Polymers, Rohm and Haas Company Booklet, CM–106, Sep./1976.

Steel Structures Painting Council SSPC–PS 24.00, Latex Painting System For Industrial and Marine Atmospheres, Performance–Based, Aug. 1,1991.

Steel Structures Painting Council, SSPC–PS Guide 12.00, Guide For Selecting Zinc–Rich Painting Systems, Nov. 1, 1982.

ASTM Designation: D1210–79, Standard Test Method For Fineness Of Dispersion Of Pigment–Vehicle Systems, Reapproved 1988.

*Primary Examiner*—Benjamin Utech
*Assistant Examiner*—Erma Cameron
*Attorney, Agent, or Firm*—Sudhir G. Deshmukh

[57] ABSTRACT

A multi-component waterborne corrosion resistant coating composition used as an organic zinc rich primer for protecting metal substrate from corrosion. The composition includes zinc dust, a crosslinking component and a polymeric component produced from a low Tg polymer and an amine functional curing agent. These components of the composition are stored separately and then mixed prior to applying the coat of the composition over metal substrate.

The coating composition of the present invention has longer pot life than conventional waterborne corrosion resistant coating composition.

1 Claim, No Drawings

5,652,024

WATERBORNE ZINC-RICH PRIMER COMPOSITIONS

This is a divisional of application Ser. No. 08/407,514, filed on Mar. 16, 1995, now U.S. Pat. No. 5,569,6877.

The present invention generally relates powdered zinc-rich coating compositions suitable for use as anticorrosion protective coatings on metal substrates and more particularly relates to waterborne zinc-rich organic primers suitable for protecting of steel substrates from corrosion.

Corrosion is the natural deterioration or destruction of a material resulting from its interaction with the environment. The corrosion process is generally electrochemical it nature. The term is applied mostly to metals and particularly to their reaction with oxygen and water that results in corrosion of metallic surfaces. Several approaches have been utilized in providing corrosion protection. One of the most attractive approaches has been the use of zinc-rich coatings to prevent corrosion. Zinc is an active metal and it exhibits higher reducing potential than many metals and their alloys, such as, for example, iron, cadmium, cobalt, nickel and copper metals and their alloys. The amphoteric nature of zinc, forming divalent zinc ions in acid or neutral media and zincate ions in basic media, makes it useful as a reducing agent that protects less electronegative metals, such as, iron. Thus, as long as physical contact is maintained, a coating of zinc will be preferentially oxidized while the underlying metal substrate surface, which acts as an electrical conductor to transfer electrons from zinc to oxygen, is protected.

One of the means of protecting metal or metal alloy substrates, such as steel substrates, is to coat such surfaces with corrosion-resistant primers, that incorporate powdered zinc, also known as zinc dust, as a metallic pigment. Zinc-rich primers are known in the art and have been commercially available since the 1940s. Zinc-rich primers typically include film-forming organic or inorganic binders for binding the zinc dust into a film. The present invention is directed to organic binder-based zinc-rich primers. Organic binder-based zinc-rich primers employ solvent borne or waterborne systems. Solvent borne primer compositions have a high volatile organic component (VOC), which makes them undesirable due to environmental concerns and safety and health issues. Therefore, zinc-rich primer manufacturers would like to reduce the organic solvent content through the use of substantially waterborne primer coatings. For example, three-component waterborne coatings based on a zinc-rich epoxy emulsion are described in Japanese patent Sho 52-54724. One of the problems associated with such a waterborne composition is its short pot life. These compositions have a tendency to form a skin or crust in a very short time, i.e., in less than 1 to 2 minutes, after the components are mixed to form a pot mix. The skin or crust formation is undesirable since it not only results in coatings of uneven thicknesses that provide poor rust protection but it also tends to plug up orifices of nozzles of spray coating equipment typically used in applying corrosion-resistant coating compositions. The present invention addresses the problem of short pot life by providing a waterborne multi-component zinc-rich primer having longer pot life than the known compositions. A pot mix of the claimed composition does not form a skin or crust, even over extended periods of 3 to 5 days and still provides effective corrosion protection. As a result, the composition of present invention is capable of producing a corrosion protective coating having uniform thickness.

Therefore, the present invention is directed to a multi-component corrosion-resistant waterborne coating composition comprising:

a polymeric component comprising an aqueous dispersion of polymer particles of a latex polymer having a Tg in the range of −50° C. to +50° C. and a stabilizing amount of an amine-functional curing agent;

a crosslinking component coreactable with the amine-functional curing agent; and a corrosion protector component comprising a corrosion resisting amount of a zinc dust, wherein the stabilizing amount of the amine-functional curing agent is sufficient to stabilize the polymer particles in the aqueous dispersion in the presence of the corrosion protector component.

The present invention is further directed to a method of producing a corrosion-resistant coating on a metal substrate comprising:

mixing a stabilizing amount of an amine-functional curing agent with polymer particles of a latex polymer having a Tg in the range of −50° C. to +50° C. to form an aqueous dispersion of a polymeric component;

mixing a corrosion protector component comprising a corrosion resisting amount of a zinc dust with the polymeric component whereby the aqueous dispersion of the polymer particles is stabilized in the presence of the corrosion protector component by the amine-functional curing agent;

mixing a crosslinking component coreactable with the amine-functional curing agent with the mixture of the polymeric and the corrosion protector components to a form a pot mix;

applying a layer of the pot mix on the metal substrate; and crosslinking the amine-functional curing agent with the crosslinking component in the layer to form the corrosion-resistant coating on the metal substrate.

The inventive aspect of the present invention is the dual role played by the amine-functional curing agent in the waterborne zinc-rich composition.

Firstly, the applicants have discovered that by incorporating a stabilizing amount of the amine-functional curing agent in the composition, which contains an aqueous dispersion of latex polymer particles and zinc dust, the dispersion stability of such latex polymer particles is maintained by the curing agent in the presence of the zinc dust in the composition. It is believed, without reliance thereon, that the reactive amine of the curing agent associates with the latex polymer particles and thereby prevents zinc from gelling the polymer particles and thus preventing the rapid skin or crust formation.

Secondly, the applicants have discovered that once a coating of the present composition is applied over a metal surface, the amine functional curing agent, which helps stabilize the latex polymer during the initial stage, then crosslinks with a crosslinking component of the composition and thereby substantially eliminates the amine functionality from the coating of the present composition. The removal of the amine functionality from the coating of the composition is important since its presence leads to a water sensitive coating having poor rust protection.

As used herein:

"Latex polymer" means latex polymer particles dispersed in an aqueous medium.

"Emulsion polymer" is a latex polymer produced by the emulsion polymerization process.

"Polymeric component" is a film forming substance or a combination of substances which includes a latex polymer, coalescing agents, surfactants and an evaporable carrier phase, such as water. The polymeric component may optionally include a pigment.

"Composition solids" means weight of the composition in its dry state.

"Waterborne coating composition" means a composition that utilizes water as the primary continuous dispersing phase.

"Solvent borne coating composition" means a composition that utilizes an organic solvent as the primary continuous dispersing phase.

"Multi-component (also known as multi-package) composition" means a composition having two or more components that are stored separately and then mixed to form a pot mix, which is then applied as a coating on a metal surface.

"Pot life" means a period of time beyond which a pot mix develops skin or crust and is too viscous to be applied effectively as a coating on a substrate.

The multi-component corrosion-resistant waterborne coating composition of the present invention generally includes from 5 percent to 30 percent, preferably from 10 percent to 18 percent, by weight of the composition solids of a polymeric component. The polymeric component includes an aqueous dispersion of polymer particles of a latex polymer, preferably a hydrophobic latex polymer. The polymeric component generally includes from 5 percent to 15 percent, preferably 8 percent to 12 percent, by weight of the composition solids of the latex polymer.

The latex polymer of the present invention may be copolymerized from at least one comonomer, such as, for example, an alpha, beta-ethylenically unsaturated monomer, including styrene, butadiene, alpha-methylstyrene, vinyl toluene, vinyl naphthalene, ethylene, vinyl acetate, vinyl versatate, vinyl chloride, vinylidene chloride, acrylonitrile, methacrylonitrile, (meth)acrylamide; various (C1-C20) alkenyl esters of (meth)acrylic acid, such as, for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl(meth)acrylate, palmityl (meth)acrylate, and stearyl (meth)acrylate; other (meth)acrylates, such as, isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxy-alkyl (meth)acrylate, such as, ethoxyethyl (meth)acrylate; mono- and dialkyl esters of ethylenically unsaturated di- and tricarboxylic acids and anhydrides, such as, ethyl maleate, dimethyl fumarate, trimethyl aconitate, and ethyl methyl itaconate. As used herein, "(meth)acrylate" denotes both "acrylate" and "methacrylate."

The ethylenically unsaturated monomer may also include in the range of from 0 to 5 percent by weight based on the total weight of composition solids, of at least one multi-ethylenically unsaturated monomer effective to raise the molecular weight and to crosslink the polymer. Examples of multi-ethylenically unsaturated monomers that can be used include allyl (meth)acrylate, tripropyleneglycol di(meth)acrylate, diethyleneglycol, di(meth)acrylate, ethyleneglycol di(methyl)acrylate, 1,6-hexanediol di(meth)acrylate, 1,4-butylene glycol dimethacrylate, 1,3-butyleneglycol (meth)acrylate, polyalkylene glycol, di(meth)acrylate, diallyl phthalate, trimethylolpropane, tri(meth)acrylate, divinyl benzene, divinyl toluene, trivinyl benzene and divinyl naphthalene.

The latex polymer of the present invention is preferably polymerized from a monomeric mixture that includes amounts in the range of from 0 to 10 percent, preferably in the range of from 0.1 to 4 percent, all based on the total weight of the composition solids, of a stabilizing copolymerizable monomer, which improves the dispersion stability of the particles of the latex polymer. Examples of stabilizing copolymerizable monomers include acrylamide, methacrylamide, acrylic acid, methacrylic acid, itaconic acid and beta-acryloxypropionic acid.

Copolymerizable monomers having other types of functionality, such as, adhesion-promoting monomers disclosed in U.S. Pat. No. 2,871,223 to Harkins et al., in the range of from 0.1 to 2 weight percent, based on the total weight of the composition solids, may also be included the latex polymer of the present invention. The method for preparing such adhesion monomers is disclosed in U.S. Pat. No. 5,071,902 to Langerbeins et al.

More preferably the latex polymer is copolymerized from a monomeric mixture containing 20 to 55 weight percent of alkyl acrylate, such as, butyl acrylate or 2-ethylhexylacrylate, 40 to 80 weight percent of styrene or alkyl methacrylate, such as, methyl methacrylate or butyl methacrylate, and 0 to 5 weight percent of methacrylic acid, acrylamide, acrylic acid or mixtures thereof. All these weight percentages are based on the total weight of the composition solids.

The glass transition temperature of the latex polymer is in the range of from −50° C. to +50° C., preferably from +10° C. to +16° C., as measured by differential scanning calorimetry (DSC). To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method.

The polymerization techniques used tot prepare the latex polymer are well known in the art. The latex polymer may be prepared by aqueous solution polymerization with subsequent dispersion or by emulsion polymerization. Emulsion polymerization is preferred. Either thermal or redox initiation processes may be used.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant such as, for example, isoascorbic acid and sodium bisulfite may be used at similar levels.

Chain transfer agents, such as, for example, mercaptans may be used in an amount effective to provide a GPC weight average molecular weight of 25,000 to 1,000,000. "GPC weight average molecular weight" means the weight average molecular weight determined by gel permeation chromatography (GPC) described on page 4, Chapter I of The Characterization of Polymers published by Rohm and Haas Company, Philadelphia, Pa. in 1976, utilizing polymethyl methacrylate as the standard.

The diameter of the latex polymer is typically controlled by the amount of conventional surfactants added during the emulsion polymerization process. Conventional surfactants include anionic, nonionic emulsifiers or their combination. Typical anionic emulsifiers include alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, polyoxyethylenated mercaptans, long chain carboxylic acid esters, modified terminated alkylaryl ether, and alkylpolyether alcohols. Preferred diameter of the polymer is in the range from 50 to 600 nanometers, and more preferably in the range from 80 to 200 nanometers.

Alternatively, the latex polymer may include multi-stage polymer particles having to or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. A GPC weight average molecular weight of these multi-stage polymer particles is preferably in the range of 5000 to 2,000,000.

The multi-stage polymer particles are prepared by conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The polymeric component of the present invention further includes a stabilizing amount of an amine-functional curing agent. The stabilizing amount means the amount of the amine-functional curing agent required to ensure dispersion stability of the polymer particles in the presence of zinc dust. Thus, higher the amount of zinc dust present in the composition, more will be the amount of the curing agent required to ensure dispersion stability of the polymer particles and vice versa. The stabilizing amount of the amine-functional curing agent in the composition is generally adjusted to be in the range of from 0.1 to 6 weight percent, preferably in the range of from 0.5 to 3 weight percent, all based on the total weight of the composition solids.

Any non-polymeric polyfunctional amine having at least 2 primary or secondary amino groups can be employed as the amine-functional curing agent in the present invention. Such amines include aliphatic and cycloaliphatic amines each having 2 to 10 primary or secondary amino groups and 2 to 100 carbon atoms. Preferred non-polymeric polyfunctional amines include 2 to 4 primary amino groups and 2 to 20 carbon atoms. Still further in this regard, suitable non-polymeric polyfunctional amines include, but not limited hexamethylene diamine; 2-methyl pentamethylene diamine; 1,3-diamino propane; 1,3-diamino pentane; dodecane diamine; 1,2-diamino cyclohexane; 1,4-diamino cyclohexane; para-phenylene diamine; 3-methyl piperidine; piperazine; N-amino ethylpiperazine; isophorone diamine; bishexamethylene triamine; diethylene triamine; ethylene diamine; diethylamine triamine; triethylene tetramine; tris (2-aminoethyl) amine; ethylene oxide-amine; polyoxyalkylene amines, such as, Jeffamine® D, ED and T series polyoxypropylene amine, supplied by Texaco Chemical Company of Houston, Tex.; amine-functional acrylic resins, disclosed in U.S. Pat. No. 4,120,839; trimethyl hexamethylene diamine; and tetraethylene pentamine. Mixtures of these amine-functional curing agents can also be used. The most preferred epoxy curing agent is a polyoxypropylene amine having the formula:

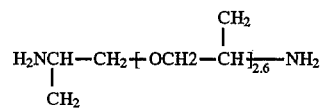

which is supplied under the trademark Jeffamine ® D-230 polyoxypropylene amine; by Texaco Chemical Company, Houston Tex.

The polymeric component of the present invention optionally includes a corrosion inhibiting pigment for enhancing the corrosion protection provided by the resulting composition. The polymeric component includes in the range of from 0 to 15 percent, preferably in the range of from 1 to 5 percent, all by weight percent based on the composition solids, of the corrosion inhibiting pigment. The suitable particle size of the corrosion inhibiting pigment is in the range of 5 to 50, preferably in the range of 10 to 20 micrometers.

Some of the corrosion inhibiting pigments suitable for use in the present invention include zinc oxide; modified barium metaborate sold under the trademark Busan® 11M1 barium metaborate and supplied by Buckman Laboratories, Memphis, Tenn.; zinc hydroxy phosphite sold under the trademark Nalzin® 2 supplied by NL Industries, Heightstown, N. J., aluminum tripolyphosphate modified by zinc ion and silicate sold under the trademark K-white® 84 supplied by Tayca Corp., Tokyo, Japan; Zinc phosphate; basic zinc molybdenum phosphate; strontium chromate and strontium zinc phosphosilicate. The preferred the corrosion inhibiting pigment is a basic zinc molybdenum phosphate sold under the trademark Heucophos® ZMP supplied by Heucotech Limited, Fairless Hills, Pa.

The pot life of the present composition is in the range of from 3 to 5 days. By contrast, zinc-rich compositions known in the art have a pot life of an hour to up to 8 hours.

Depending on the intended use of the composition, additional components may be added to the polymeric component. These additional components include but not limited to defoamers, waxes, silicone-based slip additives, wetting agents, preservatives, plasticizers, thickeners, dispersants, cosolvents and freeze/thaw protectors.

The composition of the present invention includes a crosslinking component, stored separately from the polymeric component until the user is ready for coating application. The number equivalent amount of crosslinking component of the present composition is stoichiometrically selected based on the number equivalent amount of the amine-functional curing agent present in the polymeric component. The stoichiometric ratio of the crosslinking component to the amine-functional curing agent varies in range of from 0.5 to 2, preferably in the range of from 0.8 to 1.2. Most preferably the stoichiometric ratio is 1. Preferably, the crosslinking component is in a liquid state at the application temperature, i.e., the temperature at which the coating composition is applied to a substrate. Such a temperature is preferably the ambient temperature. The crosslinking component may be emulsified in water or dissolved in water with a cosolvent, such as, ethylene glycol monobutyl ether. The crosslinking component in an emulsified form is preferred. Some of the suitable crosslinking components include reaction products of epichlorohydrin with bisphenol A or bisphenol F containing at least two oxirane rings; epoxidized novolac resins formed by reaction of epichlorohydrin with the reaction product of phenol with formaldehyde; reaction products of epichlorohydrin and an aliphatic polyol, such as, glycerol. An aqueous emulsion of the reaction product of epichlorohydrin with bisphenol A, such as, the one from Shell Chemical Co. known as Epi-Rez ® CMD W 60-3510 emulsified epoxy resin is more preferred. The applicants contemplate the crosslinking component to include an epoxy functionality having more than one epoxy group.

The composition of the present invention includes a corrosion resisting amount of a corrosion protector component that includes zinc dust. The corrosion protector component is preferably stored separately from the polymeric component and the crosslinking component until the user is ready for a coating application. The corrosion resisting amount of the zinc dust used in the present composition is in the range of from 60 to 93 weight percent, preferably in the range of from 75 to 85 weight percent, all based on the weight of the composition solids.

The important aspect of the zinc dust is its particle size. The zinc dust having higher percentage of particles with smaller particle size, provides more surface area, which increases the physical contact between the zinc dust and the underlying metal surface being protected. As stated earlier, such increased contact results in improved corrosion protection. The particle size of the zinc dust is commercially available in "Standard size", "Fine size" and "Very fine size". The zinc dust particles having "Very fine size" are preferred. Table 1 below provides the desired particle size distribution:

TABLE 1

|  | Standard Size | Fine Size | Very Fine Size |
| --- | --- | --- | --- |
| Weight median diameter, µm* | 8 | 5 | 4 |
| Percentage smaller than 10 µm* diameter | 65 | 95 | 99 |
| Surface area, square meter/gram | 0.1 | 0.16 | 0.2 |
| Apparent density, kilogram/meter cube | 3040 | 2400 | 2240 |
| Particles under 44 µm* | 98 | 99 | 100 |

*µm is micrometers.

The more preferred zinc dust meets the specification D-520-51 (recertified in 1976) established by American Society for Testing Materials, Philadelphia, Pa. and shown in Table 2 below:

TABLE 2

|  | Type 1* | Type 2* |
| --- | --- | --- |
| Total zinc (minimum) | 97.5 | 98.0 |
| Metallic zinc (minimum) | 94.0 | 94.0 |
| Materials other than metallic zinc and zinc oxide | 1.5 | N.A. |
| CaO (maximum) | 0.7 | 0.7 |
| Pb (maximum) | N.A. | 0.01 |
| Fe (maximum) | N.A. | 0.02 |
| Cd (maximum) | N.A. | 0.02 |
| Cl (maximum) | N.A. | 0.01 |
| S as $SO_3$ (maximum) | N.A. | 0.01 |
| Moisture (maximum) | 0.1 | 0.1 |
| Oils (maximum) | N.A. | 0.05 |

TABLE 2-continued

|  | Type 1* | Type 2* |
| --- | --- | --- |
| Zinc oxide residue | 6.0 | Remainder |
| Dust particle size +150 µm** | None | 0.1 |
| Dust particle size +75 µm** | N.A. | 0.8 |

*All in weight percentages, N.A. means not available, and
**µm is micrometers.

The specification for Type II zinc dust in Table 2 was developed for applications, such as, coated water pipes carrying potable water or coated metal containers used for storing food. Of particular concern in such applications are the contents of lead and cadmium, with respective maxima at 0.01 percent and 0.02 percent based on the total weight of the zinc dust.

The most preferred zinc dust suitable for use in the invention is Zinc Dust 64 supplied by Zinc Corporation of America, Monaca, Pa.

The corrosion protector component optionally includes zinc oxide, talc and silica dust.

The corrosion protector component further optionally includes copper dust. The presence of copper dust is especially suitable for anti-fouling paints used in the marine environments, such as, ship hulls and bottoms. It is believed without reliance thereon, that the presence of copper dust in the composition of the present invention is particularly inimical to the marine organisms responsible for barnacle growth and other fouling organisms.

Another embodiment of the present invention is a two-component corrosion-resistant waterborne composition that includes the polymeric component and a solvent dispersion of the cross linking component in water miscible solvent, such as, ethylene glycol monobutyl ether, and the corrosion protector component mixed therein.

To produce a corrosion-resistant coating on metal substrates, such steel substrates, the polymeric component of the present invention is mixed with the corrosion protector component and the crosslinking component to a form a pot mix. The pot life of the pot mix is in the range of from 3 to 5 days. The pot mix is prepared and then applied over the substrate preferably within 16 to 24 hours by conventional means, such spraying or brushing.

It is contemplated that coatings produced from rite composition of the present invention may be used as a primer coat of a corrosion protection system. The corrosion protection system typically includes a primer coat having a thickness in the range of from 25 micrometers to 125 micrometers, preferably 75 micrometers, applied over a metallic substrate and a top coat having a thickness in the range of from 25 micrometers to 125 micrometers, preferably 75 micrometers, applied over the primer coat. Optionally a mid-coat having a thickness in the range of from 25 micrometers to 125 micrometers, preferably 75 micrometers, may be applied between the primer coat and the top coat. The top coat and the mid-coat, if present, are typically produced from suitable polymers, such as, latex polymers, which are preferably pigmented.

The present composition is suitable for use in many primer applications, such as, for example, coatings on appliances, nuclear power plants, coiled metal, maintenance coatings, off-shore drilling rigs, oil super tankers, pilings, oil and water pipelines, ship super structures, shop coats, stacks, storage tanks, transmission towers, metal bridges and outdoor steel structures; railroad cars; ship hulls and other marine structures, such as, piers. The present composition is also suitable for OEM automotive applications, such as, for example protecting the automotive underbodies front corrosion by the inorganic salts used to aid removal of ice and snow from highways and city streets. The automotive underbodies or doors or other restrictive areas of the automobile may be dip coated, spray coated or injected with the coating of the present invention to protect the underlying metal substrates from corrosion.

The following test procedures were used for generating the data reported in the Examples below:

1) Dispersion instability of the polymer particles in an unstirred pot mix was determined visually by the presence or absence of a skin or crust in the pot mix. Absence of skin or crust formation indicates dispersion stability.

2) Salt spray exposure test performed under ASTM B117-90 established by American Society of Testing Materials, Philadelphia, Pa., exposes a coated metal plate specimen to a continuous salt spray of a 5% sodium chloride solution at 95° F.

3) Humidity exposure test conducted under the same procedure as above, except the salt spray was replaced with a deionized (DI) water spray.

In all these exposure tests, the coated specimens were exposed for at least 96 hours to determine the extent of corrosion of the underlying metal substrate and blistering of the corrosion resistant coating thereon. The coating was considered to have passed these exposure tests if less than 10 percent area of the underlying metal substrate exhibits rust and if less than 10 percent area of the corrosion resistant coating develops blisters. The readings for rust formation were expressed in terms of the percentage of the coated area exhibiting rust, i.e., no rust would have a reading of 0 and totally rusted surface would have a reading of 100. Similarly, the readings for blister formation were expressed in terms of the percentage of the coated area with blisters, i.e., a coated surface with no blisters would have a reading of 0 and a totally blistered surface would have a reading of 100.

The metal plate specimens used for these exposure tests were 10.2 cms×10.2 cms cold rolled rectangular steel plates having a thickness of 0.0635 millimeters (2.5 mil). Prior to coating, these specimens were cleaned by air grit blasting to remove any dirt, grease and rust spots.

Unless stated otherwise, all percentages and proportions given in the following examples or in the test procedures described above are by weight based on the total weight of the composition.

The Examples 1, 2 and 3, shown in Table 3 below, were prepared and tested to establish the stabilizing role played by the amine-functional curing agent in maintaining the stability of the aqueous dispersion of the present composition in the presence of zinc dust and also to determine the effect of the hydrophobicity of the latex polymer used in the composition on the corrosion resistance of the resulting composition.

TABLE 3

|  | Example 1 | Example 2 | Example 3 |
|---|---|---|---|
| Polymeric component |  |  |  |
| Water | 10.17 | 10.17 | 10.36 |
| Flash Rust Preventive[1] | 1.30 | 1.30 | 1.32 |
| Dispersant[2] | 0.28 | 0.28 | 0.29 |
| Thickener[3] | 0.10 | 0.10 | 0.10 |
| Defoamer[4] | 0.09 | 0.09 | 0.09 |

TABLE 3-continued

|  | Example 1 | Example 2 | Example 3 |
|---|---|---|---|
| Latex Polymer | 15.54*<br>46.5 BA/53.2 MMA/1.3 MAA | 12.67*<br>46.5 BA/53.2 MMA/1.3 MAA | 12.67*<br>48 BA/46.5 Sty/3 AM/2.5 AA |
| Amine-functional curing agent[5] | 0.0 | 1.29 | 1.29 |
| Corrosion protector component[6] | 67.82 | 69.09 | 69.09 |
| Epoxy resin component[7] | 4.69 | 4.69 | 4.77 |

Abbreviated monomers are BA = Butyl Acrylate, MMA = methyl methacrylate, AA = Acrylic acid, AM = acrylamide, MAA = methacrylic acid and Sty = styrene.
*latex Polymer is an aqueous dispersion of 50 percent by weight.
**latex Polymer is an aqueous dispersion of 45 percent by weight.
Unless stated otherwise the following components were used in the above Examples:
1 = an aqueous solution of 15 percent by weight sodium nitrite is supplied by Baker Chemicals.
2 = Tamol ® 165 Dispersant is an aqueous solution of 22 percent by weight supplied by Rohm and Haas Company, Philadelphia, Pennsylvania.
3 = Acrysol ® QR-708 Thickener is an aqueous solution of 35 percent by weight supplied by Rohm and Haas Company, Philadelphia, Pennsylvania.
4 = Tego Foamex ® 825 defoamer is an aqueous solution of 25 percent by weight supplied by Tego-Chemie, USA, Hope Well, Virginia
5 = Jeffamine ® D-230 is supplied by Texaco Chemical Company, Houston, Texas
6 = Zinc Dust No. 64 is supplied by Zinc Corporation of America, Monaca, Pennsylvania
7 = Epi-Rez ® CMD W 60-3510 epoxy resin is an aqueous solution of 65 percent by weight supplied by Shell Chemical Co., Houston, Texas The polymeric component of Example 1 was prepared by mixing the various ingredient in the order shown in Table 3. The corrosion protector component was then mixed with the polymeric component and after 10 minutes of mixing, an emulsified crosslinking component was added. In Example 1, skin and crust formation took place, within 2 minutes after the stirring was stopped.

The polymeric component of Examples 2 and 3 was prepared by premixing the amine-functional curing agent with the latex polymer and then allowing the mixture to stand for 24 hours. Various ingredients of the polymeric component listed in Table 3 were then added in the order shown. The corrosion protector component was then mixed with the polymeric component and after 10 minutes of mixing an emulsified crosslinking component was added. No skin or crust formation was observed and the compositions of Examples 2 and 3 did not destabilize even after five days at ambient conditions (24° C. at 50% relative humidity). Thus, it is seen that the presence of the amine-functional curing agent in the compositions of Examples 2 and 3 prevents destabilization of the aqueous dispersion of the latex polymer in the polymeric component of the present coating composition.

Example 3 was compared with Example 2 to determine the effect of the hydrophobicity of the latex polymer utilized in the polymeric components of Examples 2 and 3 on the degree of corrosion protection provided by the coating of the resulting compositions. The metal plate specimens were coated within two hours after preparing the compositions of Examples 2 and 3 and then tested for rust and blister formation under the salt spray and humidity exposure tests. One set of coated specimens were force dried in a recirculating air oven at a temperature of 60° C. for 30 minutes (Force dry). After 24 hours under ambient conditions, the force dried specimens were exposure tested for 750 hours. Another set of coated specimens were air dried under ambient conditions for a week (Air dry) and then exposure tested for 500 hours. Results are tabulated in Tables 4 and 5 below:

TABLE 4

Rust Ratings

| | | Example 2 | Example 3 |
|---|---|---|---|
| Salt Spray | Force Dry | 5 | 5 |
| | Air dry | 10 | 0 |
| Humidity | Force dry | 0 | 0 |
| | Air dry | 0 | 0 |

TABLE 5

Blister Ratings

| | | Example 2 | Example 3 |
|---|---|---|---|
| Salt Spray | Force Dry | 0 | 0 |
| | Air dry | 40 | 20 |
| Humidity | Force dry | 50 | 20 |
| | Air dry | 80 | 40 |

By analyzing Tables 4 and 5, it is seen that Example 3 which includes a more hydrophobic latex polymer, i.e., a latex polymer prepared from a styrene monomer, provides better ruse and blister protection than Example 2.

Examples 4, 5 and 6, described below in Table 6, having different amine-functional curing agents were prepared by using the procedure described in Example 2.

TABLE 6

| | Example 4 | Example 5 | Example 6 |
|---|---|---|---|
| Polymeric component | | | |
| Water | 10.36 | 10.28 | 10.31 |
| Flash Rust Preventive[1] | 1.32 | 1.32 | 1.32 |
| Dispersant[2] | 0.29 | 0.29 | 0.29 |
| Thickener[3] | 0.10 | 0.10 | 0.10 |
| Defoamer[4] | 0.09 | 0.09 | 0.09 |
| Latex Polymer 46.5 BA/53.2 MMA/1.3 MAA | 12.67# | 12.57# | 12.61# |
| Amine-functional curing agent[5] | 1.29* | 2.05** | 1.74*** |
| Corrosion protector component[6] | 69.09 | 68.52 | 68.79 |
| Epoxy resin component[7] | 4.78 | 4.74 | 4.76 |

Abbreviated monomers are BA = Butyl Acrylate, MMA = methyl methacrylate, MAA = methacrylic acid, Sty = styrene.
latex Polymer is an aqueous dispersion of 50 percent by weight.
Unless stated otherwise the following components were used in the above Examples:
1 = an aqueous solution of 15 percent by weight sodium nitrite is supplied by Baker Chemicals.
2 = Tamol ® 165 Dispersant is an aqueous solution of 22 percent by weight supplied by Rohm and Haas Company, Philadelphia, Pennsylvania.
3 = Acrysol ® QR-708 Thickener is an aqueous solution of 35 percent by weight supplied by Rohm and Haas Company, Philadelphia, Pennsylvania.
4 = Tego Foamex ® 825 defoamer is an aqueous solution of 25 percent by weight supplied by Tego-Chemie, USA, Hope Well, Virginia
5 = Jeffamine ® D-230 is supplied by Texaco Chemical Company, Houston, Texas
* = Jeffamine ® D-230 curing agent,  = Jeffamine ® D-400 curing agent and * = Jeffamine ® T-403 curing agent
6 = Zinc Dust No. 64 is supplied by Zinc Corporation of America, Monaca, Pennsylvania
7 = Epi-Rez ® CMD W 60-3510 epoxy resin is an aqueous solution of 65 percent by weight supplied by Shell Chemical Co., Houston, Texas Metal plate specimens were coated with the compositions of Examples 4, 5 and 6 and then force dried by the procedure described earlier. The specimens were then exposure tested for 750 hours to determine which amine-functional curing agent provides better corrosion protection. The test results are listed in Table 7 below.

TABLE 7

Rust Ratings

| | | Example 4 | Example 5 | Example 6 |
|---|---|---|---|---|
| Salt Spray | Force Dry | 10 | 90 | 30 |
| Humidity | Force dry | 0 | 5 | 5 |

From Table 7, it is seen that Example 4, which includes Jeffamine® D-230 curing agent, provides better protection than the other two amine-functional curing agents.

Finally, Examples 7 and 8, described in Table 8 below, were prepared to observe the effect of the inclusion of a corrosion inhibiting pigment on the enhancement of corrosion protection provided by the composition of the present invention.

TABLE 8

| | Example 7 | Example 8 |
|---|---|---|
| Polymeric component | | |
| Water | 1.4 | 1.3 |
| Flash Rust Preventive[1] | 1.15 | 1.06 |
| Latex Polymer 46.5 BA/53.2 MMA/1.3 MAA | 17.29* | 16.00* |
| Water | 6.80 | 2.21 |
| Dispersant[2] | 0.24 | 0.22 |
| Thickener[3] | 0.25 | 0.23 |
| Defoamer[4] | 0.08 | 0.07 |
| Amine-functional curing agent[5] | | |
| Corrosion inhibiting Pigment[6] | 0 | 7.48 |
| Corrosion protector component[7] | 68.07 | 62.96 |
| Epoxy resin component[8] | 4.71 | 4.36 |

Abbreviated monomers are BA = Butyl Acrylate, MMA = methyl methacrylate, MAA = methacrylic acid, Sty = styrene.
*latex Polymer is an aqueous dispersion of 50 percent by weight.
Unless stated otherwise the following components were used in the above Examples:
1 = an aqueous solution of 15 percent by weight sodium nitrite is supplied by Baker Chemicals.
2 = Tamol ® 165 Dispersant is an aqueous solution of 22 percent by weight supplied by Rohm and Haas Company, Philadelphia, Pennsylvania.
3 = Acrysol ® SCT-270 Thickener is an aqueous solution of 21 percent by weight supplied by Rohm and Haas Company, Philadelphia, Pennsylvania.
4 = Tego Foamex ® 825 defoamer is an aqueous solution of 25 percent by weight supplied by Tego-Chemie, USA, Hope Well, Virginia
5 = Jeffamine ® D-230 is supplied by Texaco Chemical Company, Houston, Texas
6 = Heucophos ® ZMP zinc molybdenum phosphate is supplied by ZMP Co., Fairless Hills, Pennsylvania
7 = Zinc Dust No. 64 is supplied by Zinc Corporation of America, Monaca, Pennsylvania
8 = Epi-Rez ® CMD W 60-3510 epoxy resin is an aqueous solution of 65 percent by weight supplied by Shell Chemical Co., Houston, Texas Metal plate specimens were coated with the compositions of Examples 7 and 8 and then air dried by the procedure described earlier. The specimens were then exposure tested for 1400 hours to determine the effect of the corrosion inhibiting pigment in the composition on the corrosion protection resulting therefrom. The test results are shown below in Table 9.

TABLE 9

| Test | Blister Ratings | |
| --- | --- | --- |
| | Example 7 | Example 8 |
| Salt Spray | 5 | 5 |
| Humidity | 75 | 0 |

From the results provided in Table 9; if is seen that addition of corrosion inhibiting pigment in the polymeric component of Example 8 reduces blister formation.

What is claimed is:

1. A method of producing a corrosion-resistant coating on a metal substrate comprising:

mixing a stabilizing amount of an amine-functional curing agent having at least two primary or secondary amino groups with polymer particles of a latex polymer having a Tg in the range of −50° C. to +50° C. to form an aqueous dispersion of a polymeric component;

mixing a corrosion protector component comprising a corrosion resisting mount of a zinc dust with said polymeric component whereby said aqueous dispersion of said polymer particles is stabilized in the presence of said corrosion protector component by said mine-functional curing agent;

mixing a crosslinking component coreactable with said amine-functional curing agent with said mixture of said polymeric and said corrosion protector components to a form a pot mix;

applying a layer of said pot mix on said metal substrate; and crosslinking said amine-functional curing agent with said crosslinking component in said layer to form said corrosion-resistant coating on said metal substrate.

* * * * *